June 1, 1965 F. ULRICH 3,187,312
CIRCUIT ARRANGEMENT FOR BINARY STORAGE ELEMENTS
Filed Jan. 25, 1961
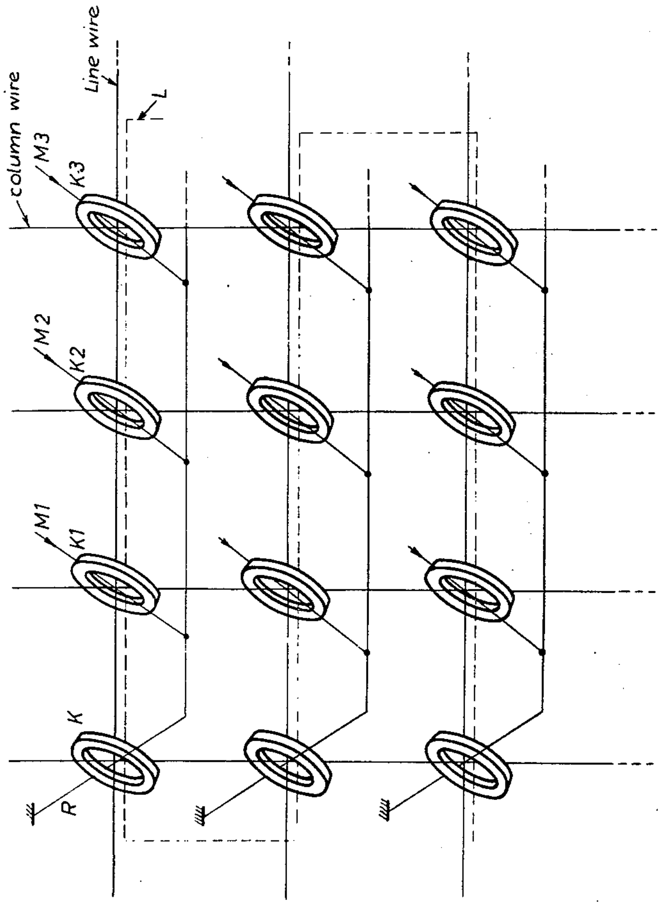
INVENTOR
F. ULRICH
BY [signature]
ATTORNEY 3,187,312

CIRCUIT ARRANGEMENT FOR BINARY STORAGE ELEMENTS

Friedrich Ulrich, Neustadt, near Waiblingen, Germany, assignor to International Standard Electric Corporation, New York, N.Y., a corporation of Delaware Filed Jan. 25, 1961, Ser. No. 84,946
Claims priority, application Germany, Feb. 19, 1960, St 16,134
8 Claims. (Cl. 340—174)

This invention relates to an apparatus for signalling the presence of information in storage devices.

In data-processing systems as well as in the communication art storage devices are required for various purposes. These storage devices record information, permitting it to be interrogated at some later time. To this end binary types of storage elements are used, and in particular, ferrite cores. Generally these binary storage elements are arranged in a coordinate array, and the interrogation of the stored information is effected in a cyclical manner, i.e. the lines and columns of the array are interrogated successively; one at a time and in turn. An example of a practical application of such a type of storage device is the assessing of charges in telephone-switching systems. In this case one ferrite core is assigned to each telephone line to be supervised. The ferrite cores of a large number of lines are assembled in one coordinate array. An incoming counting pulse on the telephone line is conducted to the associated ferrite core in the array, and is stored in this particular core. During the cyclical interrogation of the stored information the recorded pulse is transferred to a main storage. From this main storage the evaluation and accounting of the accrued charges with respect to the particular telephone line or subscriber's station are then effected.

Such arrays may become very voluminous. In order to reduce the interrogation time of such an array it has been proposed to skip individual lines of the array where no information has been stored. To this end one complete line of array is interrogated in parallel. Each column of the matrix is provided with a reading amplifier of its own, and with a special storage device, e.g. a flip-flop circuit. During the parallel line interrogation the magnetic state of the marked cores of the particular line, i.e. of those cores in which an information is stored, is inverted. Via the reading amplifiers, which are assigned to the individual cores of the line, the above mentioned flip-flop circuit is brought into one or the other condition. The condition of the flop-flop circuits accordingly represents the condition of the cores of one line interrogated in parallel. Upon determining that a marking is contained in at least in one of the flip-flop circuits, then the flip-flop circuits are interrogated and their state or condition is transferred to the main storage. In the course of this, it is determined whether one core of the line is marked. If none are marked it is obvious in the flip-flop circuits, and an immediate transfer to the next line of the array is effected; and this line is interrogated in parallel as described above.

The disadvantage of the above mentioned arrangement resides in the high investment in circuitry since each column requires a reading amplifier, as well as a flip-flop circuit of its own. The investment in circuit elements, in relation to the number of marking connections, is substantially higher than if the interrogation were effected individually in a cyclical manner. A further disadvantage of this arrangement is to be seen in the fact that it is impossible, without a considerable additional expenditure, to use auxiliary storages for avoiding double-counting operations in the case of contact-controlled marking circuits. In the case of an individual interrogation of the cores, such auxiliary storages can be inserted, without any additional connecting means for lines and columns, into those of the interrogation storage by the series connection of their line and column wires. In the case of a parallel-line interrogation both a reading amplifier and a flip-flop stage would have to be provided for each column of the auxiliary storage. In order to effect an individual writing into cores of the auxiliary storage, however, an additional pulse generator is still required for each column.

The object of the present invention is to decrease the interrogation time of a coordinate array of binary storage elements and to enable such a time-saving interrogation also in cases where auxiliary storages or auxiliary cores have to be available for other purposes.

According to the invention this aim is accomplished in that to the binary storage elements which are assembled in groups in one coordinate direction of the array, there is assigned an additional storage element which is marked in common with the storage elements of the group. During the cyclical interrogation, the condition of the additional storage element is first ascertained and its condition forms a criterion for the existence of an information stored in any of the storage elements of that group. The condition of the additional storage element is evaluated, and utilized for suppressing the cyclical individual interrogation of the storage elements of the group, transferring the interrogation to the next group of storage elements. Preferably, ferrite cores are used as binary storage elements of the group. In the arrangement all ferrite cores of the group are provided with one individual marking wire. This marking wire is provided with a common return conductor which is led through the additional ferrite core.

The above mentioned and other features and objects of this invention and the manner of attaining them will become more apparent and the invention itself will best be understood by reference to the following description of an embodiment of the invention taken in conjunction with the accompanying drawing wherein:

The single figure shows a portion of a coordinate array of bistably operated ferrite cores, each exhibiting square loop hysteresis, aranged in accordance with the invention.

In the top one of the three lines shown in the figure are four ferrite cores; namely K, K1, K2 and K3. Both the column and line wires are threaded in the conventional manner through these cores. In addition thereto, a common reading wire L is threaded through all of the cores, as is indicated by the dash line in the drawing. A special marking loop is assigned to each core of the line. For example, marking wire M1 is assigned to core K1 and, correspondingly, marking wires M2 and M3 are assigned to cores K2 and K3 respectively. These marking wires are threaded in the same direction through the cores. They are then assembled to form one common return lead (conductor) R, and are thus led in common through the additional core K. Thus if a marking pulse is applied to any one of the cores K1 to K3, then the additional core K is also marked.

This additional core, which is provided for each line, is interrogated in the course of the cyclical interrogation, prior to the interrogation of the individual cores of the line. By its circuit condition, this additional core is decisive for the further interrogation. For example, if this core has been marked, then this indicates that a marking likewise exists in at least one core of the line. In this case the cyclical individual interrogation of the line is carried out in the conventional manner. However, if the additional core has not been marked, then this serves as a criterion for indicating that this line may be skipped. The next line is provided with an additional core which is first interrogated for providing the indicia whether the next line is to be interrogated or may also be skipped and so on.

It may happen that at the instant of the interrogation of the additional core K, several marking currents are applied to the cores of the associated line. Since these marking currents are also applied to the additional core K they would prevent a reversal (inversion) of the magnetic state of this particular core during interrogation. For this reason no output signal is received from this core. This erroneous condition or state could be the cause of a non-interrogation of the cores of this line, and of a transfer of the beginning of the interrogation to the next line. In order to avoid this it is advisable to interrogate the additional core with a current flowing in the same direction as the marking current, and then to evaluate the absence of an output signal as a criterion for effecting the individual interrogation. In this case, however, the additional core has to be immediately inverted after each interrogation. The arrangement of the marking wires is made in such a way that the marking wires on the one hand, and the common return conductor of the marking wires on the other hand, are led through the associated ferrite cores in opposite directions. In this way it is possible to compensate for the influencing of the reading loop caused by noise signals on the marking lines (marking wires).

Of course, it is also possible to form several groups in one line of the array. Each such group then requires a common return conductor for the marking wires which are led through the special additional core. This arrangement is not only suitable for forming groups in the lines, but also in the columns.

The invention lends itself to the formation of large-size matrices equipped with ferrite cores. In spite of their size, the average time required for the interrogation of the matrix is not extended over the smaller ones. In this case the principle of the serial interrogation is adhered to so that auxiliary storages can be used for avoiding double countings, as well as for avoiding pulse losses in cases where the interrogation is carried out at the trailing edge of the marking pulse.

It will be understood that various changes in the details, materials and arrangements of parts which have herein been described and illustrated in order to explain one embodiment of the invention may be made by those skilled in the art within the principle and scope of the invention, as expressed in the appended claims.

What is claimed is:

1. An apparatus for decreasing the interrogation time of a plurality of storage elements, comprising a plurality of groups of storage elements arranged for random access, an additional storage element corresponding to each said group, means for conditioning said additional element only if at least one element in said corresponding group is conditioned, means for alternately interrogating said additional elements and said associated groups, and means for omitting the interrogation of any one of said groups if said associated additional element has not been conditioned prior thereto.

2. An apparatus for decreasing the interrogation time in an array of binary storage elements arranged in groups, comprising an additional storage element for each group, means for conditioning said element only if at least one element in its associated group is conditioned, means for interrogating the said groups, and means operative prior to interrogation of any group for interrogating said associated additional element to signal the presence or absence of stored intelligence in said associated group.

3. An apparatus for decreasing the interrogation time in an array of binary storage elements arranged in groups, comprising an additional binary storage element for each group, said additional element being preconditioned, means for inverting the condition of said preconditioned additional element only if at least one element in its associated group is conditioned, means for interrogating each said group, and means operative prior to each said group interrogation to interrogate each of said associated additional element, to determine the condition of the associated group, and means for preconditioning each of said additional elements subsequent to its interrogation.

4. An apparatus for decreasing the interrogation time in a coordinate array of ferrite cores arranged in groups which are to be sequentially interrogated comprising an additional ferrite core for each group, means for marking said additional core if at least one core in its associated group is marked, means for interrogating said groups of cores, and means for interrogating each of said additional cores prior to interrogation of the associated group for determining its condition as an indication of the group condition.

5. An apparatus for decreasing the interrogation time in a coordinate array of ferrite cores arranged in columns and rows which are interrogated in a cyclic manner there being a marking wire associated with each of said cores, comprising an additional ferrite core for each predetermined group of cores, a marking wire for each additional core connected in common to the marking wire of all cores of the associated group, means for interrogating each group, and means for interrogating each of the said additional cores prior to interrogation of the associated group to provide an indication of the presence or absence of stored intelligence in said associated group.

6. An apparatus as claimed in claim 4 in which each group consists of a row of ferrite cores.

7. An apparatus for decreasing the interrogation time in a coordinate array of ferrite cores arranged in columns and rows which are interrogated in a cyclic manner, comprising a plurality of groups of ferrite cores, an additional ferrite core associated with each said group of cores, an individual marking wire for each core of a group, a common return conductor connected to all of the individual marking wires of each said associated group, a marking wire for each additional core connected to the common return conductor of the associated group, means for interrogating said group, and means for interrogating each of said additional cores to provide an indication as to whether one or more of the cores in the associated group have been marked.

8. An apparatus as claimed in claim 6 in which the marking wires for the cores in the array thread the cores in a sense opposite the marking wires for the additional cores.

References Cited by the Examiner

UNITED STATES PATENTS

| | | | |
|---|---|---|---|
| 2,617,704 | 11/52 | Mallina | 340—172.5 |
| 2,691,156 | 10/54 | Saltz et al. | 340—174 |
| 3,019,422 | 1/62 | Eachus | 340—174.1 |

IRVING L. SRAGOW, *Primary Examiner.*

JOHN T. BURNS, *Examiner.*